United States Patent
Won et al.

(10) Patent No.: US 7,170,205 B2
(45) Date of Patent: Jan. 30, 2007

(54) INTERNAL WEIGHT TYPE VERTICAL VIBRATOR

(75) Inventors: Sung Hong Won, Kyungki-do (KR); Joon Choi, Kyungki-do (KR); Il Oung Park, Seoul (KR); Ju Ho Kim, Seoul (KR); Hwa Young Oh, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 302 days.

(21) Appl. No.: 10/947,145

(22) Filed: Sep. 23, 2004

(65) Prior Publication Data

US 2006/0002577 A1 Jan. 5, 2006

(30) Foreign Application Priority Data

Jul. 1, 2004 (KR) .................. 10-2004-0050997

(51) Int. Cl.
*H02K 7/065* (2006.01)
*H02K 33/06* (2006.01)
*B06B 1/04* (2006.01)

(52) U.S. Cl. .................. 310/36; 310/14; 340/407.1; 381/396; 335/296

(58) Field of Classification Search .............. 310/12, 310/14, 36, 81; 340/407.1; 355/274, 296; 381/396, 398
See application file for complete search history.

(56) References Cited

U.S. PATENT DOCUMENTS

| | | | | |
|---|---|---|---|---|
| 4,253,079 | A | * | 2/1981 | Brosh .................. 336/84 C |
| 5,953,438 | A | * | 9/1999 | Stevenson et al. .......... 381/431 |
| 6,487,300 | B1 | * | 11/2002 | Lee et al. .................. 381/396 |
| 7,038,335 | B2 | * | 5/2006 | Choi et al. .................. 310/12 |
| 2002/0061115 | A1 | * | 5/2002 | Chung et al. .............. 381/398 |
| 2005/0184601 | A1 | * | 8/2005 | Kweon et al. ................ 310/36 |
| 2005/0285453 | A1 | * | 12/2005 | Oh et al. ..................... 310/14 |

(Continued)

FOREIGN PATENT DOCUMENTS

JP 2001-239211 9/2001

(Continued)

OTHER PUBLICATIONS

Japanese Patent Office, Office Action, mailed Jun. 20, 2006.

*Primary Examiner*—Karl Tamai
(74) *Attorney, Agent, or Firm*—Lowe Hauptman & Berner, LLP.

(57) ABSTRACT

Disclosed is an internal weight type vertical vibrator including: a housing; a magnetic circuit unit placed in the internal space of the housing, and comprising a magnet perpendicularly placed and a yoke for fixedly receiving the magnet therein for generating a magnetic field; spring members provided with upper ends fixed to the housing and lower ends fixed to the magnetic circuit unit for vertically; a vibrating unit placed in the yoke so that the outer surface of the vibrating unit is surrounded by the yoke, comprising the weight having a hollow cylindrical structure provided with a central hole, into which the magnet is inserted; and a vibration-generating coil placed just below the magnetic circuit unit so that the vibration-generating coil is interlinked with the magnetic field of the magnet for allowing current supplied from the outside to flow in one direction therethrough.

9 Claims, 6 Drawing Sheets

U.S. PATENT DOCUMENTS

2006/0001324 A1* 1/2006 Won et al. .................... 310/81
2006/0002577 A1* 1/2006 Won et al. .................. 381/396

FOREIGN PATENT DOCUMENTS

| JP | 2002-153818 | 5/2002 |
| JP | 2002-263578 | 9/2002 |
| JP | 2003-300013 | 10/2003 |

* cited by examiner

INTERNAL WEIGHT TYPE VERTICAL VIBRATOR

RELATED APPLICATIONS

The present application is based on, and claims priority from, Korean Application Serial Number 2004-50997, filed Jul. 1, 2004, the disclosure of which is hereby incorporated by reference herein in its entirety.

BACKGROUND OF THE INVENTION

1. Field of the Invention

The present invention relates to a vertical vibrator, and more particularly to an internal weight type vertical vibrator, in which a yoke surrounds a weight for increasing dimensions of a region, where a coil for current is interlinked with a magnetic field of a magnet, thereby improving vibrating efficiency and vibrating power.

2. Description of the Related Art

Generally, sound and vibration are used to inform users of an incoming call. A small-sized vibrating motor is driven to generate vibration, and driving force of the vibrating motor is transmitted to a housing of a device, thereby vibrating the whole portions of the device.

A vibrating motor, which is one incoming call notification means applied to a communication device, such as a cellular phone, converts electrical energy to mechanical energy using the principle of electromagnetic force, and is installed in a cellular phone for informing users of an incoming call without sound.

As the cellular phone market has been rapidly extending and cellular phones have grown to include many additional functions, components of the cellular phone are developed toward miniaturization and high quality. Accordingly, a vibrating motor having a novel structure, which solves drawbacks of the conventional vibrating motor and has an improved quality, are required now.

FIG. 1 is a cross-sectional view of a conventional coin type vibrating motor. The conventional coin type or flat type vibrating motor 1 comprises a stator 20, a rotor 10 installed rotatably against the stator 20, and a housing 30 accommodating the stator 20 and the rotor 10.

When external power is applied to the vibrating motor 1 through a pair of brushes 25 installed on a lower substrate 21 of the stator 20, currents having different polarities flow along the brushes 25. Since upper ends of the brushes 25 elastically contact a commutator 15 formed on the lower surface of the rotor 10, power is supplied to a wound coil 12 of the rotor 10 through the commutator 15 contacting the brushes 25.

The rotor 10 is rotated in one direction centering on a shaft 31 by interaction between an electric field formed by a direction of the flow of the current induced to the wound coil 12 and a magnetic field formed by a magnet 22 of the stator 20.

Here, contact points between the brushes 25 and segments of the commutator 15 contacting the brushes 25 vary whenever the rotor 10 is rotated, and the polarity of the power is continuously changed. Thereby, the rotor 10 having the eccentric center of gravity is continuously rotated, thus inducing vibration used as a signal expressing the notification of an incoming call.

In FIG. 1, non-described reference numeral 14 represents an insulator surrounding the wound coil 12 and a weight, non-described reference numeral 32 represents a bearing member, and non-described reference numeral 35 represents a base for closing the opened lower part of the housing 30.

The above vibrating motor 1 generates mechanical vibration by rotating the rotor 10 having a weight eccentrically disposed when external power is supplied to the vibrating motor 1. The rotating force of the rotor 10 is mainly embodied by a commutator or brush type structure of the motor, which supplies current to the coil of the rotor 10 by a commutating action through contact points between the brushes 25 and the commutator 15.

However, when the above-structured vibrating motor 1 is driven, the brushes 25 pass through a gap between segments of the commutator 15, thus causing mechanical friction and electrical sparks between the brushes 25 and the segments of the commutator 15 and abrasion of the brushes 25 and the commutator 15, thereby producing foreign substances, such as black powder and shortening the lifespan of the motor.

Accordingly, in order to solve the drawbacks of the conventional commutator or brush type vibrating motor, a multifunctional actuator, serving as means for inducing sound or vertical vibration using the resonant frequency of a vibrometer, has been developed.

FIG. 2 is a cross-sectional view of a conventional multifunctional actuator. As shown in FIG. 2, the actuator 2 comprises a main case 40 having an internal space, a vibrating plate 50 installed on the upper part of the main case 40 and provided with a sound-generating coil 52 generating sound according to a signal source, installed on the lower surface thereof, a magnet 60 vertically installed in the main case 40 and provided with an upper plate 62 mounted on the upper surface thereof for forming a magnetic circuit, the upper plate 62, a weight 65 constituting a vibrating body together with a yoke 64 mounting the magnet thereon, a plate spring 66 for elastically supporting the vibrating body in the main case 40, and a vibration-generating coil 42, placed just below the vibrating body, generating vibration.

In FIG. 2, non-described reference numeral 43 represents an upper case for closing the upper part of the main case 40, and non-described reference numeral 44 represents a base provided with the vibration-generating coil 42 mounted thereon.

The actuator 2 supplies external power to the sound-generating coil 52 or the vibration-generating coil 42 through a lead wire (not shown), thereby selectively generating sound and vibration. When power is supplied to the sound-generating coil 52, the vibrating plate 50 is finely vibrated by interaction between a magnetic field generated from a magnetic circuit constituted by the magnet 60, the upper plate 62 and the yoke 64 and an electric field generated from the sound-generating coil 52, thereby generating sound.

On the other hand, when power is supplied to the vibration-generating coil 42, the vibrating body, including the magnet 60, the upper plate 62, the yoke 64 and the weight 65, which is suspended by the plate spring 66, is vertically vibrated by interaction between the magnetic field generated from the magnetic circuit including the magnet 60, the upper plate 62 and the yoke 64 and an electric field generated from the vibration-generating coil 42.

Here, the vibrating degree of the vibrating body varies according to the intensity and frequency of a signal for generating the vibration. In case that vertical vibrating width of the vibrating body is larger than a predetermined value, the vibrating body contacts the sound-generating coil 52 serving as an upper structure or the vibration-generating coil 42 serving as a lower structure, thus generating a touch tone. For this reason, as shown in FIG. 2, magnetic bodies 70, serving as dampers for absorbing impact when the vibrating body contacts the lower structure, are placed on the lower surface of the yoke 64.

The actuator 2 requires a large number of components and has a complicated structure, thus limiting miniaturization and simplification of products and increasing production costs.

Accordingly, in order to solve the above problems of the actuator 2, a vertical vibrator 3, which requires a small number of components and generates vertical vibration, has been developed.

FIG. 3 is a cross-sectional view of a conventional vertical vibrator. As shown in FIG. 3, the conventional vertical vibrator 3 comprises a case 81 having an internal space with a designated volume, a magnet 82 vertically installed therein, spring members 86 installed between the housing 81 and a yoke 84 for vibrating a vibrating body, which includes the yoke 84 mounting the magnet 82 thereon and a weight 85 installed on the outer part of the yoke 84 and constitutes a magnetic circuit together with the magnet 82, and a vibration-generating coil 87 placed on the upper surface of a base 88 closing the lower part of the housing 81.

When power is supplied to the vibration-generating coil 87, a magnetic flux, which is the flow of a magnetic field (B) generated from the magnetic circuit constituted by the magnet 82 and the yoke 84, is leaked from the lower surface of the magnet 82 and interlinked with the vibration-generating coil 87, thereby forming a route flowing toward the lower end of the yoke 84. The vibrating body, which includes the magnet 82, the yoke 84 and the weight 85 and is suspended by the spring members 86 in the housing 81, is vertically vibrated by interaction between a magnetic field of the magnetic circuit and an electric field of the vibration-generating coil 87.

Since the yoke 84 of the conventional vertical vibrator 3 surrounds the external surface of the magnet 82 vertically installed in the vertical vibrator 3, the conventional vertical vibrator 3 has a reduced magnetic resistance. However, since there generates a route of the magnetic field (B) leaked from the magnet 82, which is not interlinked with the coil 87 but is lead into the lower end of the yoke 84, vibrating efficiency and vibrating power of the conventional vertical vibrator 3 are reduced.

Further, since only a central area of the coil 87 influenced by the magnetic field leaked from the magnet 83 of the overall diameter (d) of the coil 87 generates power for generating exciting force, the degree of freedom in designing the winding number of the coil 87 placed on the base 87 is reduced.

SUMMARY OF THE INVENTION

Therefore, the present invention has been made in view of the above problems, and it is an object of the present invention to provide an internal weight type vertical vibrator, in which the quantity of the magnetic flux of a magnetic field interlinked with a vibration-generating coil is increased to improve vibrating efficiency, the vibration-generating coil is disposed to enlarge an area for generating power inducing exciting force, and the degree of freedom in designing the winding number of the coil is increased.

In accordance with the present invention, the above and other objects can be accomplished by the provision of an internal weight type vertical vibrator comprising: a housing defining an internal space having designated dimensions; a magnetic circuit unit placed in the internal space of the housing, and comprising a magnet perpendicularly placed and a yoke for fixedly receiving the magnet therein for generating a magnetic field having a designated intensity; spring members provided with upper ends fixed to the housing and lower ends fixed to the magnetic circuit unit for vertically and elastically supporting the magnetic circuit unit; a vibrating unit placed in the yoke so that the outer surface of the vibrating unit is surrounded by the yoke, comprising the weight having a hollow cylindrical structure provided with a central hole, into which the magnet is inserted, and vertically vibrated together with the vibration of the magnetic circuit unit through the spring members; and a vibration-generating coil placed just below the magnetic circuit unit so that the vibration-generating coil is interlinked with the magnetic field of the magnet for allowing current supplied from the outside to flow in one direction therethrough.

Preferably, an injection hole may be formed through the upper surface of the housing so that a damping magnetic fluid is injected into the housing through injection hole.

Further, preferably, a lower plate magnetized by the magnetic force of the magnet may be installed on the lower surface of the magnet.

Moreover, preferably, the weight may be made of a nonmagnetic material, which is not magnetized by the magnetic force of the magnet.

Preferably, a bent portion may be formed on the lower end of the yoke surrounding the weight by inwardly bending the lower end of the yoke.

Further, preferably, an inwardly stepped portion may be formed in the inner periphery of the central hole for receiving the magnet, and an outwardly stepped portion contacting the inwardly stepped portion may be formed in the outer periphery of the magnet.

Moreover, preferably, the vibration-generating coil may have an outer diameter smaller than the outer diameter of the yoke and larger than the outer diameter of the magnet.

Preferably, the vibration-generating coil may be placed on the upper surface of a base closing the opened lower surface of the housing.

Further, preferably, the base may be made of a substrate member provided with terminals for supplying power to the vibration-generating coil.

BRIEF DESCRIPTION OF THE DRAWINGS

The above and other objects, features and other advantages of the present invention will be more clearly understood from the following detailed description taken in conjunction with the accompanying drawings, in which:

FIG. 4a is a cross-sectional view of the internal weight type vertical vibrator, which is provided with a lower plate; and FIG. 4b is a cross-sectional view of the internal weight type vertical vibrator, which is not provided with the lower plate;

DESCRIPTION OF THE PREFERRED EMBODIMENTS

Now, preferred embodiments of the present invention will be described in detail with reference to the annexed drawings.

Figure 1:
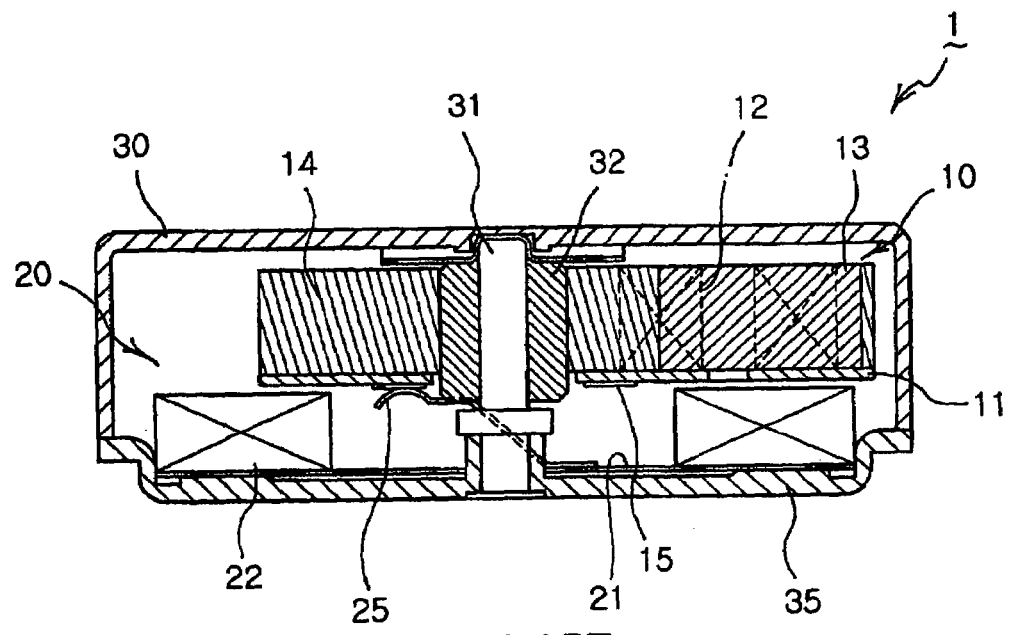
FIG. 1 is a cross-sectional view of a conventional coin type vibrating motor.
Figure 2:
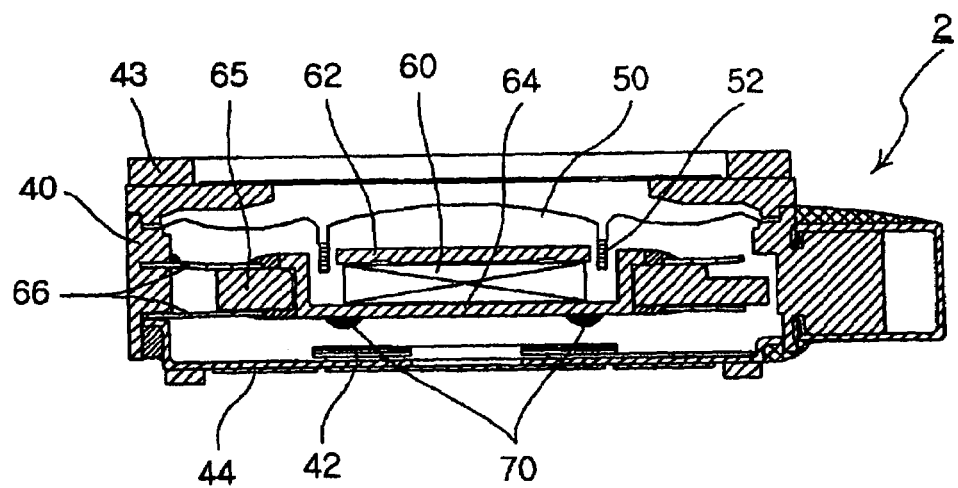
FIG. 2 is a cross-sectional view of a conventional multi-functional actuator.
Figure 3:
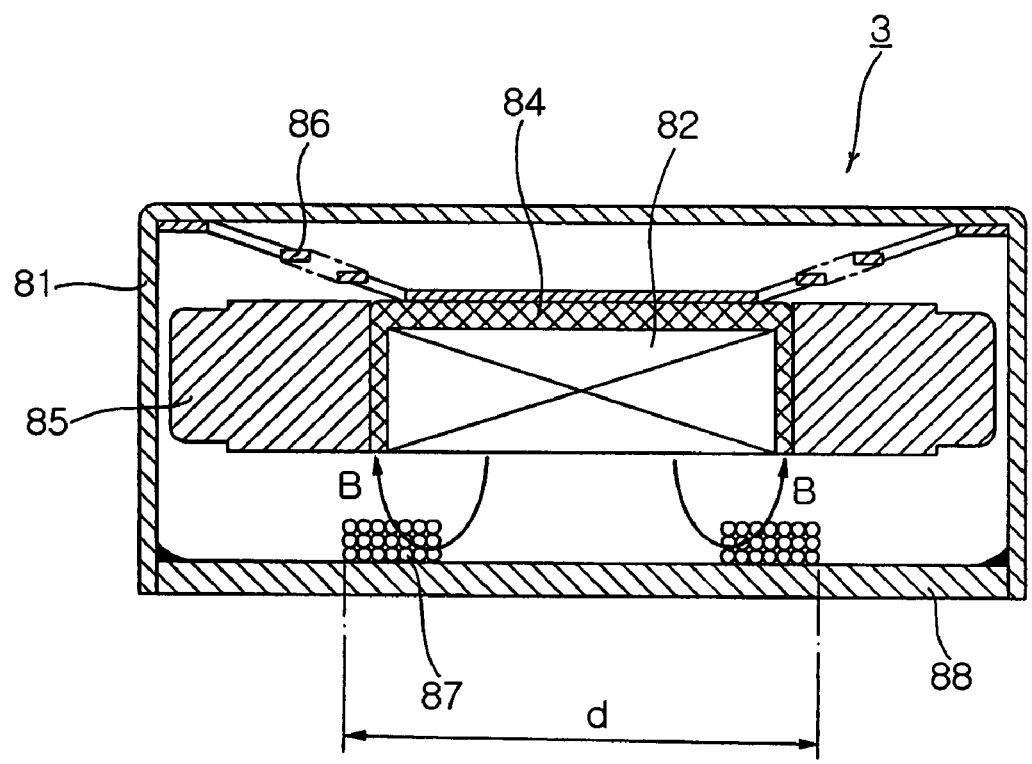
FIG. 3 is a cross-sectional view of a conventional vertical vibrator.
Figure 4A:
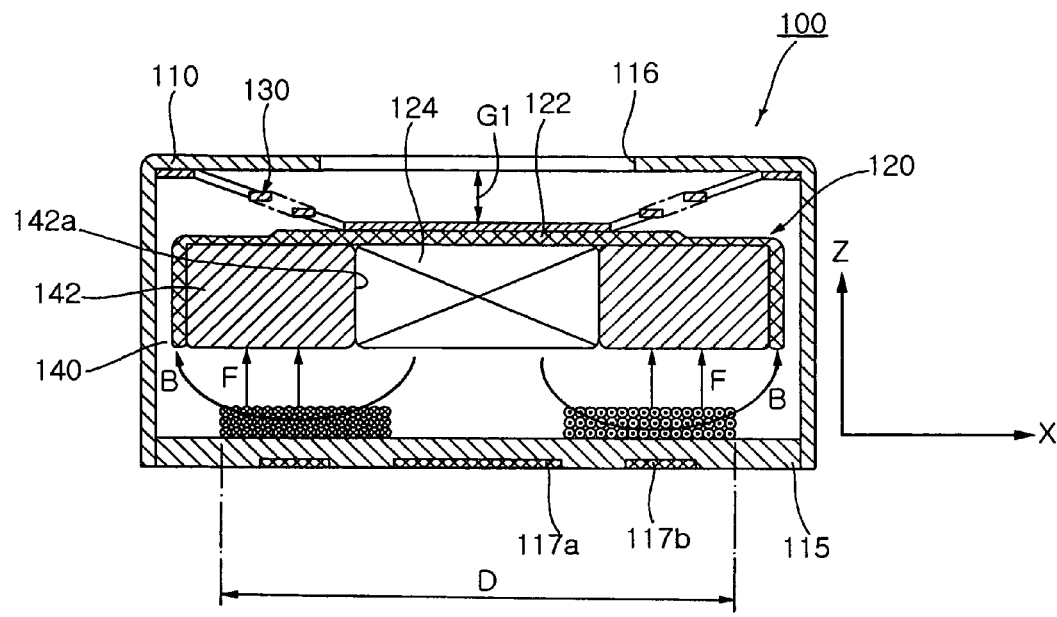
FIGS. 4a and 4b illustrate an internal weight type vertical vibrator in accordance with one embodiment of the present invention, and more specifically.
Figure 4B:
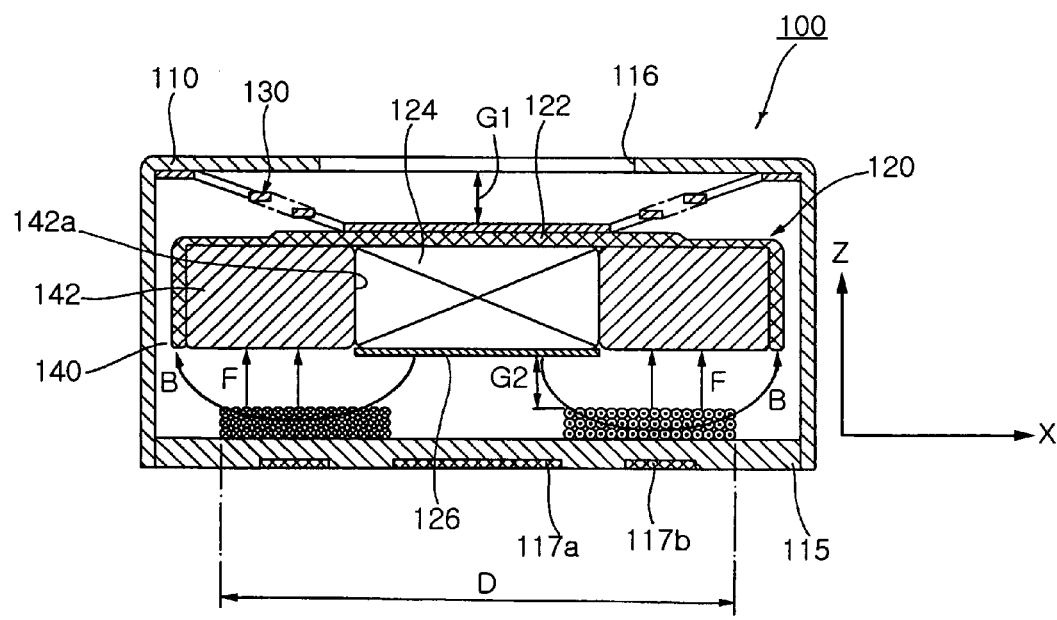
Figure 5:
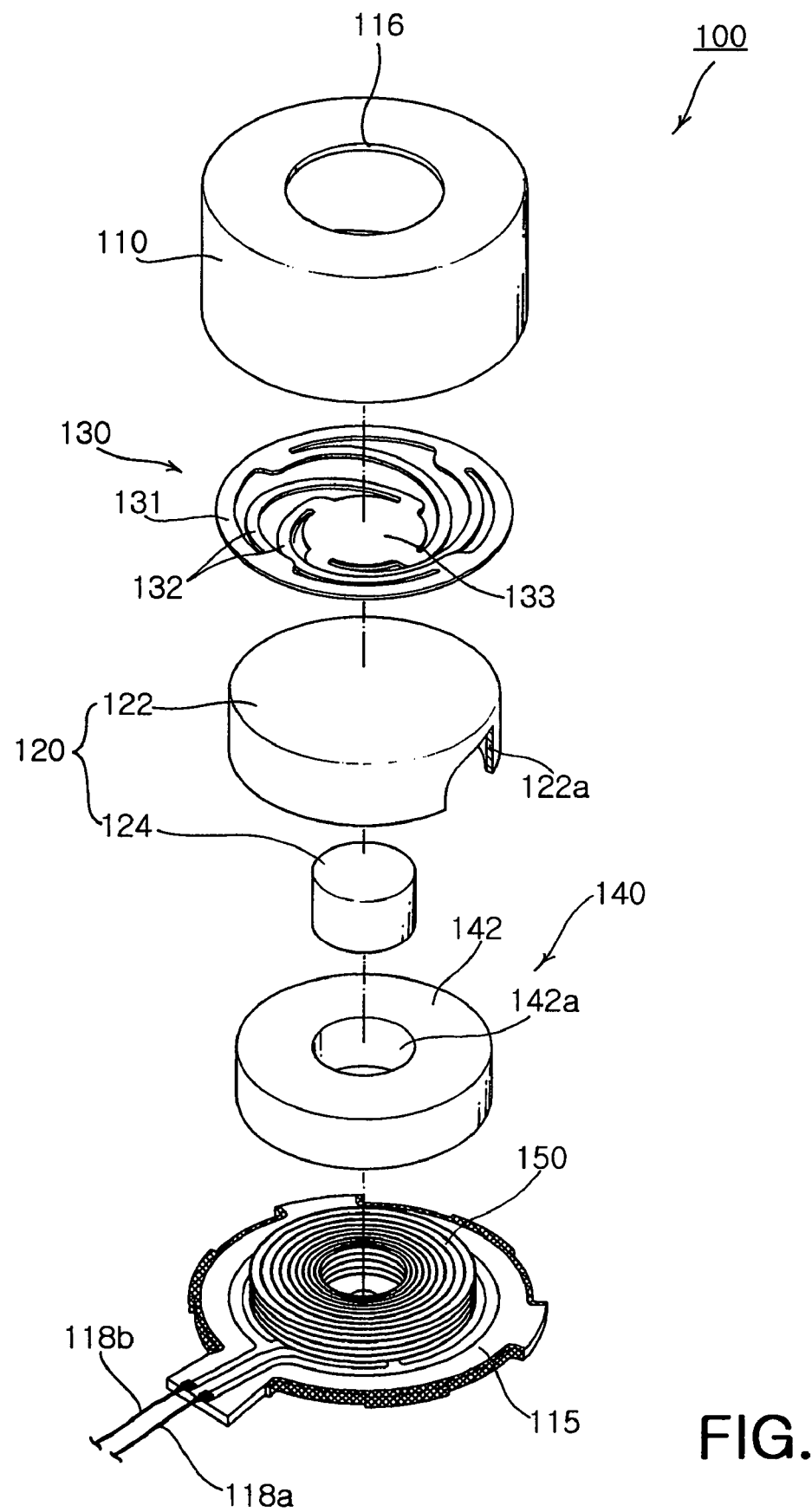
FIG. 5 is an exploded perspective view of the internal weight type vertical vibrator in accordance with one embodiment of the present invention.

FIGS. 4a and 4b illustrate an internal weight type vertical vibrator in accordance with one embodiment of the present invention, and FIG. 5 is an exploded perspective view of the internal weight type vertical vibrator in accordance with one embodiment of the present invention. As shown in FIGS. 4a, 4b, and 5, the internal weigh type vertical vibrator 100 increases an area, in which a magnetic field, having a route from a magnet 124 to a yoke 122 through a vibration-generating coil 150, and the vibration-generating coil 150 are interlinked, to increase vibrating efficiency, and enlarges an area for substantially generating force to increase vibrating power in vertical vibration. The vertical vibrator 100 comprises a housing 110, a magnetic circuit unit 120, spring members 130, a vibrating unit 140, and a vibration-generating coil 150.

That is, the housing 110 serves as a receiving member having a designated internal space, and an opened lower surface of the housing 100 is sealed by a base 115.

The magnetic unit 120 includes the yoke 122 and the magnet 124, which are disposed inside the housing 110 to generate a magnetic field having a designated intensity. The yoke 122 has a hollow cylindrical structure such that an upper surface of the yoke 122 is closed and a lower surface of the yoke 122 is opened. The magnet 124 is a permanent magnet having a cylindrical structure, and is vertically arranged such that N and S poles of the magnet 124 are longitudinally polarized.

A space for receiving a weight 142 having a hollow cylindrical structure, which will be described later, is formed between the inner surface of the yoke 122 and the outer surface of the magnet 124. Accordingly, the weight 142 integrally formed with the magnet 124 is disposed and fixed in the yoke 122.

As shown in FIG. 4b, the upper surface of a lower plate 126 made of a magnetic material is attached to the lower surface of the magnet 124 by a bonding material so that the lower plate 126 is magnetized by magnetic force of the magnet 124.

The spring members 130, which are placed between the housing 110 and the magnetic circuit unit 120, serve as elastic means for vertically elastically supporting the vibrating unit 140 including the magnetic circuit unit 120.

As shown in FIG. 5, each of the spring members 130 includes a fixed ring 131 having a disk shape fixed to the closed lower surface of the housing 110, a plurality of elastic legs 132 provided with ends connected to the fixed ring 131 and bent from the ends in a spiral shape for generating elastic force, and a fixed disk 133 connected to the other ends of the elastic legs 132 and provided with a lower surface fixed to the center of the upper surface of the yoke 122 of the magnetic circuit unit 120.

Accordingly, an upper gap (G1), in which the vibrating unit 140 is vertically vibrated by the magnetic circuit unit 120 and the weight of the vibrating unit 140, correspondingly to the sagging length of the spring members 130 is formed between the housing 110 and the magnetic circuit unit 120.

The vibrating unit 140, which is vertically vibrated by the spring members 130, is surrounded by the inner surface of the yoke 122 of the magnetic circuit unit 120, and is provided with the hollow cylindrical weight 142 installed together with the magnet 124.

The weight 142 has a hollow cylindrical structure having a central hole 142a formed through the central portion thereof so that the outer periphery of the weight 142 contacts the inner surface of the yoke 122 and the inner periphery of the weight 142 contacts the outer periphery of the magnet 124.

The weight 142 is a nonmagnetic body, which is not magnetized by magnetic force of the magnet 124 inserted into the central hole 142a, and is made of a material having a high specific gravity, such as tungsten, for increasing vertical vibrating efficiency.

Thereby, the magnetic field (B) leaked from the lower surface of the magnet 124 forms a route, which does not pass through the weight 142 made of a nonmagnetic material but flows toward the lower end of the yoke 122. That is, the route of magnetic flux of the magnetic field of the magnetic circuit unit 120 is elongated.

Here, preferably, the yoke 122 surrounding the magnet 124 and the weight 142 has an outer diameter smaller than the inner diameter of the housing 110 so that the yoke 122 can be vertically vibrated without contacting the inner surface of the housing 110. Thereby, a gap having designated dimensions is formed between the inner surface of the housing 110 and the outer surface of the yoke 122, thus allowing the magnetic circuit unit 122 and the vibrating unit 140 to be vertically vibrated.

The vibration-generating coil 150 is disposed just below the magnetic circuit unit 120 and bonded to the upper surface of the base 115 closing the lower surface of the housing 110 by a bonding material so that the vibration-generating coil 150 generates an electric field having a designated intensity when external power is applied to the vibration-generating coil 150.

Preferably, the vibration-generating coil 150 is wound in a roll shape to have an outer diameter smaller than the outer diameter of the yoke 122 surrounding the weight 142 inserted into the central hole 142a, and larger than the outer diameter of the magnet 124.

In this case, when the magnetic field leaked from the lower surface of the magnet 124 of the magnetic circuit unit 122 flows toward the lower end of the yoke 122 extending in a radial direction for surrounding the weight 142, an area, in which the magnetic field is interlinked with the coil 150 having the outer diameter extending to the outer surface of the yoke 122, is enlarged, thereby enlarging an area generating force (F) for vertically moving the vibrating unit 140 including the magnetic circuit unit 120.

The base 115 closing the opened lower surface of the housing 110 is a substrate member provided with cathode and anode terminals 117a and 117b electrically connected to both ends of the vibration-generating coil 150. The cathode and anode terminals 117a and 117b are electrically connected to cathode and anode lead wires 118a and 118b respectively, thereby applying external power to the vibration-generating coil 150.

Preferably, a lower gap (G2) formed between the lower surface of the magnetic circuit unit 120 and the upper surface of the vibration-generating coil 150 is larger than the upper gap (G1) formed between the housing 110 and the magnetic circuit unit 120 so as to prevent contact between the weight 142 and the vibration-generating coil 150 when the vibrating unit 140 is vertically vibrated.

At least one injection hole 116 having a designated size is formed through the upper surface of the housing 110, and a damping magnetic fluid (not shown) for preventing the direct contact between the housing 110 and the magnetic circuit unit 120 when the vibrating unit 140 is vertically vibrated is injected through the injection hole 116 and applied to the spring members 130.

Then, the injection hole 116 is safely sealed by a tape member (not shown), on which a label is printed, thereby preventing the magnetic fluid from being leaked out.

The magnetic fluid is obtained by dispersing magnetic powder in a liquid into a colloidal state and adding a surface active agent to the colloidal mixture so that the magnetic powder is not precipitated or cohered by the force of gravity or the magnetic field, and, for example, is a fluid obtained by dispersing fine particles of triiron tetroxide or iron-cobalt alloy in oil or water, or a fluid obtained by dispersing particles of cobalt in toluene. These magnetic powders are ultrafine particles of a diameter of 0.01~0.02 μm, which exhibit Brownian motion, and the concentration of the magnetic powders in the fluid is uniformly maintained even though an external magnetic field, gravity or centrifugal force is applied to the fluid.

Figure 6:
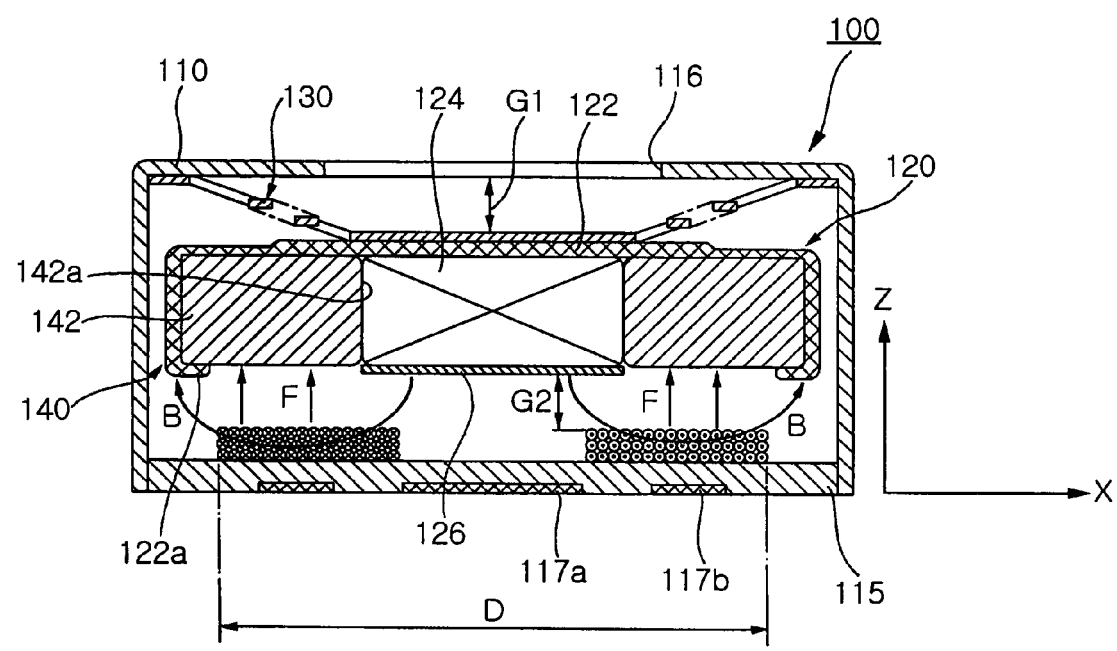
FIG. 6 is a cross-sectional view of an internal weight type vertical vibrator in accordance with another embodiment of the present invention.

In order to increase the attachment between the weight 142 and the yoke 122, as shown in FIG. 6, a bent portion 122a is formed on the lower end of the yoke 122 surrounding the weight 142 by inwardly bending the lower end of the yoke 122.

Figure 7:
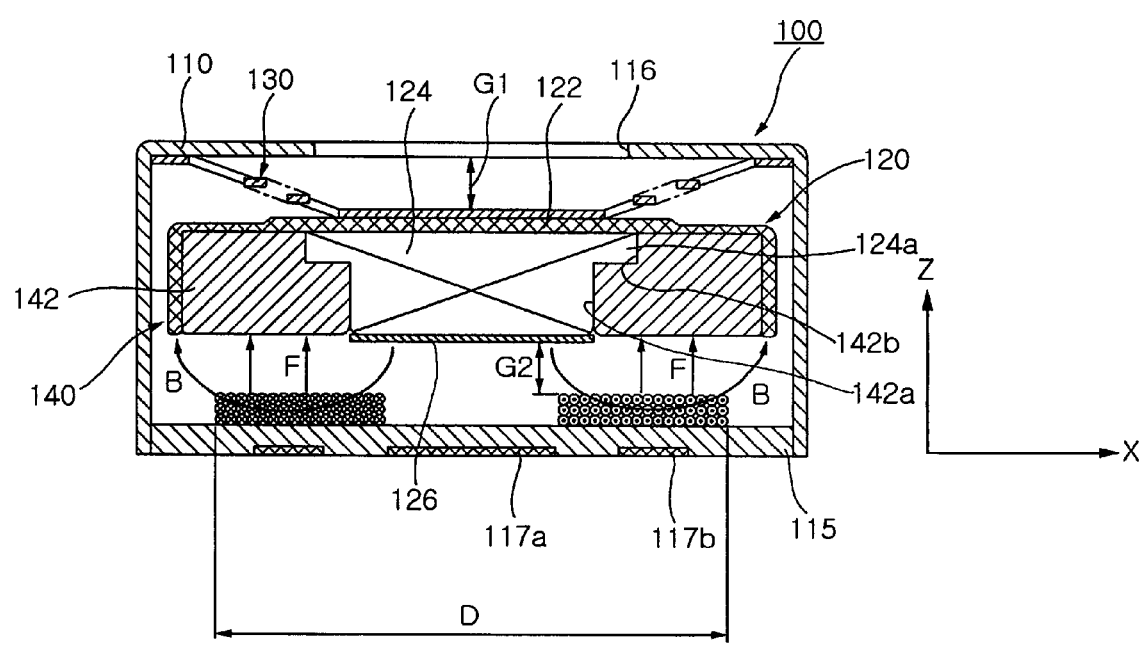
FIG. 7 is a cross-sectional view of an internal weight type vertical vibrator in accordance with yet another embodiment of the present invention.

Further, in order to increase the attachment between the weight 142 surrounded by the yoke 122 and the magnet 124 and to prevent the magnet 124 from being separated from the weight 142, as shown in FIG. 7, an inwardly stepped portion 142b is formed in the inner periphery of the central hole 142a for receiving the magnet 124, and an outwardly stepped portion 124a contacting the inwardly stepped portion 142b is formed in the outer periphery of the magnet 124.

When external power is applied to the vibration-generating coil 150 of the above-described vertical vibrator 100, an electric field is formed around the vibration-generating coil 150 by a current (I) flowing in one direction along the vibration-generating coil 150.

Since the magnetic circuit unit 120, elastically supported by the spring members 130 in the housing 110, includes the permanent magnet 124 and the yoke 122 surrounding the weight 142 provided with the central hole 142a receiving the magnet 124, the magnetic field (B) generated from the magnet 142 is leaked through the lower surface of the magnet 142 or the lower plate 126 attached to the lower surface of the magnet 142.

The magnetic field (B) leaked from the magnet 124 flows from the center of the vibration-generating coil 150 to the outside in a spiral direction, is interlinked with the vibration-generating coil 150 placed just below the weight 142, and flows over the upper surface of the magnet 124 through the lower end of the yoke 122 having the extended outer diameter for surrounding the weight 142.

Here, since the weight 142 is made of a nonmagnetic body having a specific gravity of 18 or more, such as tungsten, the magnetic field (B) of the magnet 142 does not pass through the weight 142, but rather flows toward the magnet 124 inserted into the central hole 142a of the weight 142 through the yoke 122 surrounding the weight 142.

In this case, since the vibration-generating coil 150 wound in a roll shape has an outer diameter (D) approximately extended to the outer diameter of the yoke 122 extended to the inner surface of the housing 110 for surrounding the weight 142, an area of the vibration-generating unit 150, which is interlinked with the magnetic field (B) leaked from the magnetic circuit unit 120 and flows in a spiral direction along the upper surface of the base 115, is enlarged.

That is, based on Fleming's left hand law, in which, when a left hand is spread such that the thumb, the first finger and the second finger are perpendicular, the first finger points in the direction of the magnetic field (B), the second finger points in the direction of the current (I) and the thumb points in the direction of the force (F), the force (F), which is generated from the vibration-generating coil 150 along which the current (I) flows and excites the vibrating unit 140 including the magnetic circuit unit 120, as shown in FIG. 4, is generated to the direction (z) perpendicular to the lower surface of the weight 142.

Here, since the vibration-generating coil 150 generating the force (F) is extended to the outer diameter of the yoke 122 surrounding the weight 142, an area, in which the magnetic field (B) leaked from the magnetic circuit unit 120 is interlinked with the vibration-generating coil 150 along which the current (I) flows in one direction, is enlarged as much as the extended outer diameter (D) of the vibration-generating coil 150.

Thereby, an area generating the force (F) for exciting the vibrating unit 140 including the magnetic circuit unit 120 is increased, thus increasing the vibrating power of the vertical vibrator 100.

Further, the force (F) generated from the vibration-generating coil 150 in the perpendicular direction (z) is in proportion to the magnetic field (B) and the current (I) and the length (l) of the vibration-generating coil 150 interlinked with the magnetic field (B) of the magnetic circuit unit 120, as stated in Equation 1 below.

$$F = BIl \qquad \text{[Equation 1]}$$

Here, F represents the force, B represents the magnetic field, I represents the current, and l represents the length of the coil.

Since the vibration-generating coil 150 has the outer diameter extending to the outer diameter of the yoke 122 surrounding the weight 142 under the condition that the intensity of the magnetic field (B) supplied from the magnet 142 and the intensity of the current (I) supplied from the vibration-generating coil 150 are the same as those of the conventional vibrator, and has an elongated overall length (l), the force (F) of the vibration-generating coil 150 for inducing the exciting force is increased, thereby increasing the vibrating power of the vertical vibrator 100.

Further, since the vibration-generating coil 150 interposed between the base 115 and the vibrating unit 140 is freely disposed between the outer periphery of the yoke 122 surrounding the weight 142 and the outer periphery of the magnet 124, and is designed such that the vibration-generating coil 150 can be wound in various numbers, it is possible to increase the degree of freedom in designing the vibration-generating coil 150.

As described above, the vibrating unit 140 including the magnetic circuit unit 120 is vertically vibrated in a predetermined width by the interlinkage action between the magnetic field (B) generated from the magnetic circuit unit 120 and the vibration-generating coil 150, and the vertical vibrating width of the vibrating unit 140 is determined by the elastic force of the spring members 130 for elastically supporting the vibrating unit 140.

Further, since the upper and outer surfaces of the hollow cylindrical weight 142 provided with the central hole 142a, into which the magnet 124 is inserted, are bonded to the inner surface of the yoke 122 using a bonding agent, the structure of the vertical vibrator of the present invention increases a bonded area between the weight 142 and the yoke 122 compared to the conventional structure, in which the yoke 84 surrounding only the magnet is inserted into the central hole of the weight 85, thereby preventing failures of finished products, such as the separation of the weight 142 from the yoke 122, in a falling reliability test of finished products.

As apparent from the above description, the present invention provides an internal weight type vertical vibrator, in which an area, in which a magnetic field of a magnet is interlinked with a vibration-generating coil, is enlarged by extending the outer periphery of a yoke surrounding the weight to the inner periphery of the housing and extending the outer diameter of the coil interlinked with the magnetic field of the magnet to the extended outer periphery of the yoke, thereby increasing the dimensions and length of the vibration-generating coil generating the vertical vibrating force and improving the vibrating efficiency and the vibrating power.

Further, the vibration-generating coil placed just below a vibrating unit is freely disposed between the outer periphery of the yoke surrounding the weight and the outer periphery of the magnet, and is freely designed to have various winding numbers, thereby improving the degree of freedom in designing the vibration-generating coil.

Moreover, since the bonding area between the yoke and the weight is enlarged, the bonding force between the yoke and the weight is improved, thereby preventing failures of finished products, such as the separation of the weight from the yoke, in a falling reliability test of the finished products.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An internal weight type vertical vibrator comprising:
    a housing defining an internal space having designated dimensions;
    a magnetic circuit unit placed in the internal space of the housing, and comprising a magnet perpendicularly placed and a yoke for fixedly receiving the magnet therein for generating a magnetic field having a designated intensity;
    spring members provided with upper ends fixed to the housing and lower ends fixed to the magnetic circuit unit for vertically and elastically supporting the magnetic circuit unit;
    a vibrating unit placed in the yoke so that the outer surface of the vibrating unit is surrounded by the yoke, comprising the weight having a hollow cylindrical structure provided with a central hole, into which the magnet is inserted, and vertically vibrated together with the vibration of the magnetic circuit unit through the spring members; and
    a vibration-generating coil placed just below the magnetic circuit unit so that the vibration-generating coil is interlinked with the magnetic field of the magnet for allowing current supplied from the outside to flow in one direction therethrough.

2. The internal weight type vertical vibrator as set forth in claim 1,
    wherein an injection hole is formed through the upper surface of the housing so that a damping magnetic fluid is injected into the housing through injection hole.

3. The internal weight type vertical vibrator as set forth in claim 1,
    wherein a lower plate magnetized by the magnetic force of the magnet is installed on the lower surface of the magnet.

4. The internal weight type vertical vibrator as set forth in claim 1,
    wherein the weight is made of a nonmagnetic material, which is not magnetized by the magnetic force of the magnet.

5. The internal weight type vertical vibrator as set forth in claim 1,
    wherein a bent portion is formed on the lower end of the yoke surrounding the weight by inwardly bending the lower end of the yoke.

6. The internal weight type vertical vibrator as set forth in claim 1,
    wherein an inwardly stepped portion is formed in the inner periphery of the central hole for receiving the magnet, and an outwardly stepped portion contacting the inwardly stepped portion is formed in the outer periphery of the magnet.

7. The internal weight type vertical vibrator as set forth in claim 1,
    wherein the vibration-generating coil has an outer diameter smaller than the outer diameter of the yoke and larger than the outer diameter of the magnet.

8. The internal weight type vertical vibrator as set forth in claim 1,
    wherein the vibration-generating coil is placed on the upper surface of a base closing the opened lower surface of the housing.

9. The internal weight type vertical vibrator as set forth in claim 8,
    wherein the base is made of a substrate member provided with terminals for supplying power to the vibration-generating coil.

* * * * *